Figure 1:
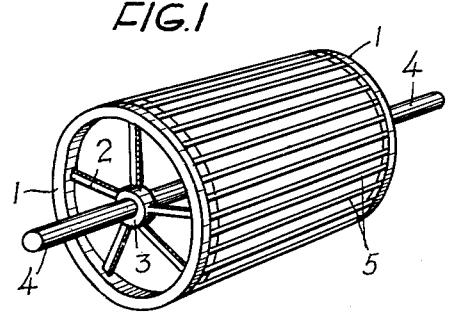

June 6, 1961   O. C. G. WENNBERG   2,987,191
STRAINER OR FILTER DRUMS
Filed March 28, 1957

INVENTOR.
OLOV CARL GUSTAV WENNBERG
BY
Irwin D. Thompson
Atty.

United States Patent Office 2,987,191
Patented June 6, 1961

2,987,191
STRAINER OR FILTER DRUMS
Olov Carl Gustav Wennberg, Karlstad, Sweden, assignor to General Engineering Company AB, Stocksund, Sweden, a corporation of Sweden
Filed Mar. 28, 1957, Ser. No. 649,224
1 Claim. (Cl. 210—497)

The present invention refers to such strainer or filter drums, particularly for purification of back-water from paper machines and the like, that are provided with screen cloth, which may possibly be caused also to pass over one or more guide rolls.

In order to provide for the greatest possible straining or filtering effect it is of importance that the contact surfaces between the cloth and the drum at the circumference of the drum are as small as possible. In known constructions this has been attained by the envelope surface of the drum having been made as a number of thin bars parallelling the axis of the drum and arranged at a suitable mutual distance.

In order that drums of this kind shall have an economical life, it is important to make them rust-proof. In consideration of this it would be conceivable to make them from a non-corrodible material, but in that case the material as well as the working costs become too high, for which reason this expedient is not serviceable in practice.

It is of importance that the drum be worked to exact dimensions, particularly with respect to the diameter thereof, which must not vary lengthwise of the drum, inasmuch as such variations impair the guidance of the screen cloth or might inflict damage on the same.

The present invention primarily aims at facilitating a rust-proof construction of drums of the type in consideration, without the requirements for exact dimensions being neglected. According to the invention, the drum may be made from a material which is not rust-resistant, and may be provided with axial grooves along the envelope of the drum in order then to be subjected to a surface treatment also in the grooves by being coated with a material which is protective against corrosion, especially plastic, so as to become non-corrodible, whereupon contact strips from a soft material such as rubber are applied in the grooves. In this way the whole drum or at least the more important parts thereof become non-corrodible, and working to exact dimensions may be easily carried out by a corresponding working of the strips, after the latter have been mounted in their places on the drum.

The grooves are dovetailed or made otherwise flaring toward their bottom portions, whereby it will be possible to cause the soft strips on their having been pressed into the grooves to remain seated in a way to ensure complete safety. Alternatively, the grooves may be made with parallel sides and then be pressed together outermost, prior to or possibly after the strips have been arranged in their places. This construction also has the advantage of facilitating an arrangement of the strips to make the latter removable, so as to permit an easy exchange of the same on any occurring damage. In order that the strips shall be retained effectively in dovetailed or similar grooves, they may be made with a thick bottom portion which is broader than the grooves, whereby the soft strips are compressed when forced into the grooves.

Figure 2:
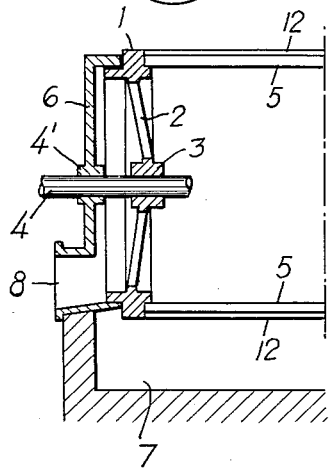

Examples of applying the invention are illustrated in the accompanying drawing. FIG. 1 is a diagrammatic perspective view of a drum constructed according to the invention. FIG. 2 shows one end portion of a similar drum when mounted in a drum filter. FIGS. 3–6 show cross sections of a bar receiving a contact strip and forming the envelope of the drum in various stages of the manufacture.

According to the drawing, the rotary filter drum consists of a pair of end members or rings 1, which are carried by spokes or spiders 2 on hubs 3 by means of stub axles 4 in bearings 4' (FIG. 2). Extending between the rings 1 are a number of axial bars 5 at a suitable mutual distance, so that intermediate spaces are formed to permit the passage of the filtered liquid. When mounted the rings 1 form a tight fit with the end walls 6 of the surrounding filter trough 7. 8 denotes an outlet for filtered liquid.

Figures 3, 4, 5, 6:
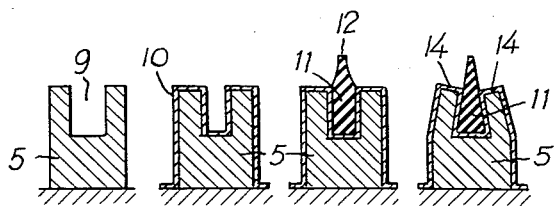

Before the drum is to be subjected to surface treatment, for instance to be covered with plastic, the bars 5 are provided with longitudinally extending grooves 9 (FIG. 3). The bars are then, as is the remainder of the drum, coated with a material 10 which is protective against corrosion, such as artificial resin lacquer or plastic, for example polyetene or polyvinyl chloride, which is also caused to cover the grooves 9, as shown in FIG. 4. After that, a contact strip 11 is pressed into the coated groove, FIG. 5. The strip, which consists of rubber or other soft elastic material, has a thick base portion, which prior to being pressed into the groove is preferably of a somewhat greater width than the latter. The outer edge 12 of the strip is relatively narrow so as to offer a small contact surface to the screen cloth intended to surround the drum, so that the strip will not reduce the effective filter area unnecessarily.

If required, the sides 14, 14 of the groove may be pressed together, as shown in FIG. 6, so as to improve the retention of the strip. Alternatively, the groove may be dovetailed from the beginning or otherwise made so as to flare inwardly toward the bottom.

After contact strips have been inserted into all of the grooves of the drum, the latter may be worked, for instance by grinding, to an exact diameter.

What I claim is:

A strainer or filter drum comprising end members, peripherally spaced axial bars having longitudinal grooves in their top surface and extending between said end members, the cross section of said grooves flaring toward the bottom of the groove, corrosion protecting material covering the surfaces of the bars and of the grooves, and contact strips having a narrow top edge portion and being made from a soft elastic material inserted and compressed to a part of their height in said grooves, the top edge portion projecting above the top surface of the bar.

References Cited in the file of this patent
UNITED STATES PATENTS

| | | |
|---|---|---|
| 302,806 | Wheatley | July 29, 1884 |
| 606,453 | Fryer | June 28, 1898 |
| 2,036,787 | Zabriskie | Apr. 7, 1936 |
| 2,101,537 | Every | Dec. 7, 1937 |
| 2,300,166 | Nowak | Oct. 27, 1942 |
| 2,520,327 | Nilson | Aug. 29, 1950 |
| 2,615,575 | Wright | Oct. 28, 1952 |
| 2,616,763 | Vose et al. | Nov. 4, 1952 |
| 2,710,693 | Manley et al. | June 14, 1955 |